Nov. 27, 1945.  G. SLAYTER ET AL  2,390,039
INSULATED ELECTRICAL CONDUCTOR
Original Filed Oct. 16, 1937
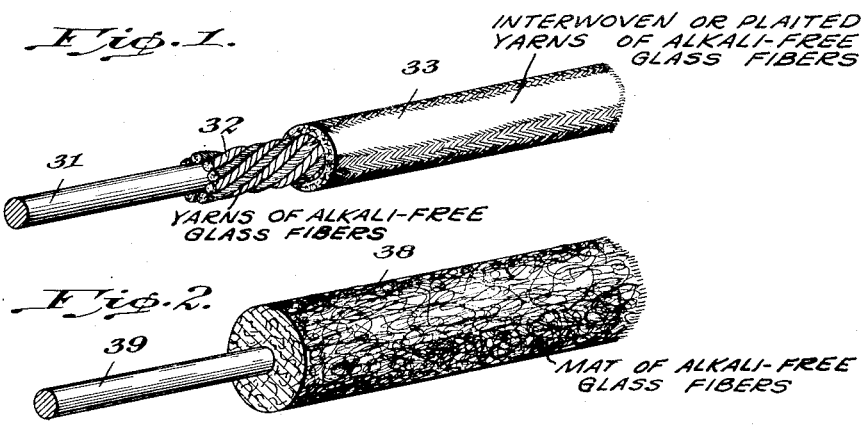
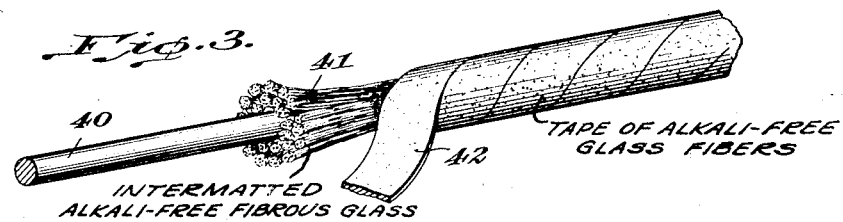
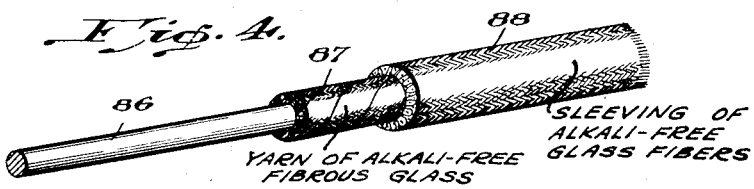
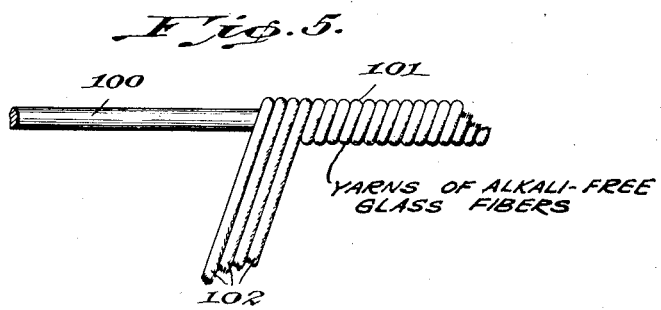
INVENTORS
Games Slayter and
A. L. Simison
BY
ATTORNEY Patented Nov. 27, 1945

2,390,039

UNITED STATES PATENT OFFICE 2,390,039

INSULATED ELECTRICAL CONDUCTOR

Games Slayter and Allen L. Simison, Newark, Ohio, assignors, by mesne assignments, to Owens-Corning Fiberglas Corporation, a corporation of Delaware Original application October 16, 1937, Serial No. 169,500. Divided and this application November 13, 1941, Serial No. 418,929

3 Claims. (Cl. 174—121)

The present invention relates to electrical insulation, and more particularly to electrical insulation for cables and wire using fibrous glass as a constituent thereof; and the invention also relates to certain improvements in the glass which increase its electrical properties, its life and service, and render the material a practical commercial success.

This application is a division of copending application Serial Number 169,500, filed October 16, 1937, and in which we are named as joint applicants with Donald C. Simpson and Jesse L. Tucker.

An advantage of fibrous glass as compounded in accordance with the invention for electrical insulation is the reduction of the possibility of moisture penetration as compared with organic fibers. In varnished cambrics or the like using organic fibers, it is difficult, if not impossible, to prevent some exposure of the fibers to the surrounding atmosphere, and to the moisture therein. When a fiber end is exposed to moisture, the latter follows the fibers, penetrating into the insulating material. Electrical currents are induced in the damp fiber and heat is generated thereby. This causes swelling of the fiber, cracks the insulation, and sometimes produces short circuits. The high pressure currents break down the dielectric resistance of the insulating material, and produce short circuits and carbonizing of the fibers.

By the use of glass fibers, moisture penetration or attack is prevented so that there is no breaking down of the insulation. If subjected to a high voltage sufficient to overcome the dielectric resistance and produce a short, the insulating value is not destroyed.

When using organic bases for electrical insulating purposes, if a short does occur and the insulation is ignited, there is a tendency for the insulation to continue to burn and support combustion so long as oxygen is available. In order to overcome this objection to a certain extent, it has been necessary heretofore to provide extra materials or fireproof coatings which increase the expense and also increase the size of the unit materially.

In the use of fibrous glass for electrical insulation, it has been found that the dielectric value and ohmic resistance of the glass gradually go down as the material is in service. The presence of moisture or the exposure of the fibrous glass to the atmosphere has been found to have a deleterious effect upon the electrical insulating value of the fibrous glass. We have found that this has been principally caused by the presence of alkali oxides which are common ingredients in glass composition.

In analyzing the situation, we have discovered that the presence of alkali in the glass, particularly in percentages above a fraction of one percent to five percent, according to the activity of the particular alkali ingredients, causes a gradual deterioration, weakening of the fibers, and a reduction in the dielectric strength. By alkali is meant the monovalent elements of the first group of the periodic system, and not the alkali earth metals of the second group. The alkali tends to leach to the surface and etch the fibers. When glass fibers manufactured from a glass containing soda ($Na_2O$) or similar alkali oxide, such as potash, lithium oxide, or the like, are exposed to moisture, there is a tendency for the moisture to react with the alkali on or near the surface of the glass to form alkali hydroxide solution or other solutions in which there is a high ionic activity of the ingredients. This alkali solution has a tendency to dissolve some of the glass exposed on the surface, which would cause an additional and progressive action on the glass. A temperature cycle has been found to materially increase this destructive action by alternately causing moisture to condense and evaporate, thereby first leaching alkali to the surface and then concentrating the solution to a point where its activity further etches the glass.

This destructive action upon the glass fibers, and the production of an active electrolyte along the surface of the fibers, becomes a major problem when the glass is attenuated into long, fine fibers, the surface area per pound of which is vastly increased so that a pound of glass may present a surface area of the order of magnitude of a thousand square feet of exposed surface.

In order to minimize this effect, it is possible to neutralize the alkali by the use of an acid or other neutralizing agent such as a salt, although this assistance is only temporary and does not adequately increase the dielectric value of the fibrous glass. Washing of the fibrous glass also assists the dielectric value, but this is short-lived since the great activity of the alkali causes its presence to be again made felt on the surface of the fibers.

In order to overcome this difficulty, we employ certain compositions of glass which are alkali free and which have a very high dielectric value when reduced to fine, attenuated fibers.

A major problem in the search of an alkali free glass for this purpose is to find one which has not only the proper dielectric properties, but also has a viscosity curve rendering the glass suitable to be attenuated into fibrous glass, and one which will not readily devitrify in the ordinary fibrous glass melting apparatus.

In this connection it is desirable to provide a glass which will have working temperatures of about 2200° F. to 2500° F., and which will have a softening point in the range of about 1000° F. to 1300° F. Thus while the working ranges of the glass should be relatively low in order to assist melting and maintenance of temperature conditions, the glass should not have too low a softening point, since it is desired to have as high a heat resistance as possible. This feature becomes more important as the fiber diameter of the fibrous glass is decreased owing to the experienced phenomenon that the decrease of fiber diameter depresses the softening point. In other words, it is possible for a glass to have its softening point lowered several hundred degrees when it is attenuated into long, fine fibers.

We have discovered the following range of glass composition makes for a superior grade of fibrous glass which may be readily fabricated into fibers, and which when so fabricated has a relatively high softening point and a high dielectric value:

| | |
|---|---|
| Alkali metal oxide | 0 to 5% (preferably 0%) |
| Alkaline earth oxide | 15 to 40% |
| Alumina | 15 to 30% |
| Silica | 40 to 65% |

These compositions may also include 0 to 7% fluorine in place of some of the oxygen. In other words, the various metals may be present partly as fluorides instead of entirely as oxides.

The glass fibers employed in the present invention may be produced by various methods, as, for example, that illustrated and described in the Slayter and Thomas Patent No. 2,133,236 by which process fibrous glass of the staple type is produced, or by the method and apparatus illustrated and described in the Slayter and Thomas Patent No. 2,234,986, by which continuous glass fibers are made. The yarns or threads and fabrics may be constructed by any suitable methods.

Various other objects and advantages of the present invention will become apparent from the following description taken in conjunction with the drawings, in which:

Fig. 1 is a perspective view shown partly in section of an electrical conductor insulated in accordance with the present invention;

Fig. 2 is a diagrammatic perspective view shown partly in section of a conductor insulated with intermatted glass or other mineral fibrous material;

Fig. 3 is a perspective view shown partly in section of an electrically insulated conductor;

Fig. 4 is a fragmentary perspective view shown partly in section of an electrically insulated indoor power cable;

Fig. 5 is a perspective view shown partly in section of an electrical conductor insulated with multiple wound yarn.

In Fig. 1 we have illustrated a conductor 31 having a serving of intertwisted fibrous glass yarns 32 composed of alkali free glass, which have been spirally wound around the conductor. The fibrous glass may, as previously mentioned, be of either the staple type or continuous type. Around the outer surface of the yarn may be applied a tube 33 of interwoven or plaited fibrous glass yarns of alkali free glass. Again, the fibrous glass may be of either the staple or continuous type. If it is desired to waterproof the insulation of the conductor 31, it is possible to impregnate the tube 33 with a suitable impregnating material such as asphalt, Glyptal resins, rubber, urea formaldehyde, phenol aldehyde resins, varnishes, Vinylite or other plastic, or other coating substances.

Fig. 2 illustrates a form of fibrous glass insulation in which a mat of glass fibers 38 is provided around a conductor 39. The mat 38 is preferably impregnated with a suitable dielectric binder such as asphalt, varnish, synthetic resins or the like. The fibers should preferably be extremely fine in order to permit bending of the wire without causing the insulation to break away from the wire at the bend.

Fig. 3 illustrates another embodiment of the present invention in which a metal conductor 40 is surrounded with a layer of intermatted fibrous glass 41. The layer 41 may be built up of juxtaposed rovings or slivers overlying the conductor 40, or may be applied directly to the wire from a fiber collecting drum or cone through which the wire is passed axially during the process of forming glass wool.

Overlying the matted layer 41 is a serving of tape or varnished cambric-type strip 42 which may be spiralled around the layer 41. The cambric-type strip or tape 42 may be of any suitable type as, for example, it may be composed of an impregnated web or mat of fibrous glass or the like. In forming such tapes, a web of fibrous glass is deposited upon a conveyor, and may there be bonded with a suitable substance such as starch, agar agar, latex, pectin, asphalt, varnish, resinous material, or the like, and then it may have an additional impregnation, forming a film of insulating varnish, resinous substance, rubber, or the like. If desired, the insulating impregnation may be applied alone to act as a binder. The tape may also be formed on an ordinary tape loom using staple or continuous type glass fiber strands or twisted fibrous glass yarns. If desired, it is also possible to form this tape of a web, mat, or interwoven fabric of combined fibrous glass and asbestos fibers or other mineral fibers. Such a tape may be impregnated, if desired, with any suitable coating or binding material such as those mentioned above. The tape 42 may also be formed of fibrous glass, bonded web or woven fabric juxtaposed to a strip of Cellophane or, less preferably, paper. The layer 41 may also be formed by bonding a warp of fibrous glass threads or strands onto strips of Cellophane. This combination may be also used for various other electrical insulation purposes.

In Fig. 4 we have disclosed an indoor power cable comprising an electrical conductor 86, having a serving thereover of staple or continuous type fibrous glass yarn 87 acting as insulation, and an outer covering of impregnated staple or continuous type fibrous glass braided sleeving 88 or the like.

Fig. 5 discloses a conductor 100 having a layer of insulation 101 thereover composed of multiple end wound yarns 102. To assist the winding, strips of juxtaposed Cellophane, paper or the like may be used. To reduce slipperiness a coating of paraffin or other semi-plastic substance may be applied during the multiple winding process. By winding simultaneously a plurality of parallel yarns over the conductor 100, it is possible to materially decrease the amount of winding required to apply the insulation. This type of wire may be used for magnet wire or the like and may be impregnated, if desired, with such substance above noted.

The present invention is also adaptable for high tension oil filled transmission cables. Fibrous glass may be incorporated with the oil to provide adequate dielectric strength. Voltages of the order of 180,000 volts may thus be easily transmitted.

Various modifications and variations may be resorted to without departing from the spirit and scope of the present invention as defined in the appended claims.

We claim:

1. An article of manufacture comprising a wire and a covering therefor, said covering comprising an inner layer of unwoven substantially alkaline-free glass fibers of the staple type adjacent the wire and an outer layer of substantially alkaline-free glass fibers of the continuous type, the layer of unwoven glass fibers forming a resilient backing for the outer layer, and a coating of insulating varnish on the outer layer of glass fibers, the insulating varnish impregnating the inner and outer layers of glass fibers of different types.

2. An article of manufacture comprising a wire and a covering therefor, said covering comprising an inner layer of unwoven substantially alkaline-free glass fibers of the staple type applied directly around and over the wire and an outer layer of substantially alkaline-free glass fibers of the continuous type applied directly over and around the inner layer, the fibers of the inner and outer layers having an average diameter of not more than .00025 inch, the inner layer of staple fibers being sufficiently resilient to permit bending of the covered wire without damage to the outer covering.

3. An article of manufacture comprising a wire and a covering therefor, said covering comprising an inner layer of unwoven substantially alkaline-free glass fibers of the staple type adjacent the wire and an outer layer of substantially alkaline-free glass fibers of the continuous type, the layer of unwoven glass fibers forming a resilient backing for the outer layer.

GAMES SLAYTER.
ALLEN L. SIMISON.